Figure 1:
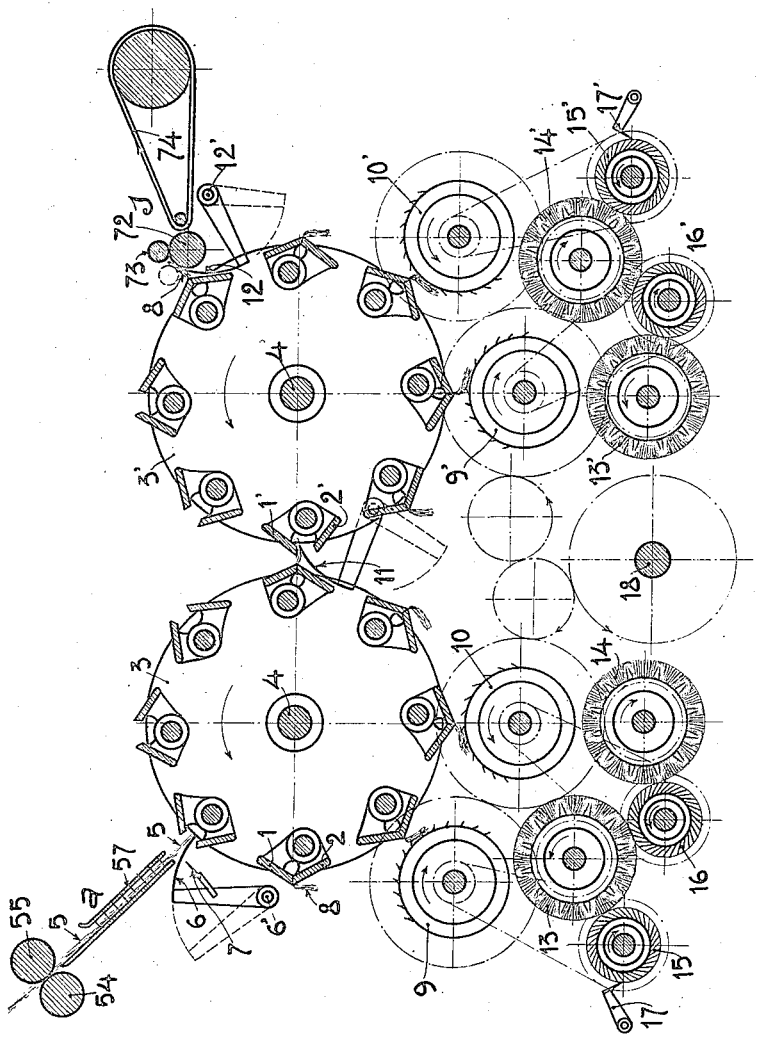

R. SCHLEIFER.
MACHINE FOR COMBING TEXTILE FIBERS.
APPLICATION FILED MAY 17, 1921.

1,425,059.

Patented Aug. 8, 1922.
12 SHEETS—SHEET 1.

Inventor.
Riccardo Schleifer.
By Henry Orth Jr.
atty.

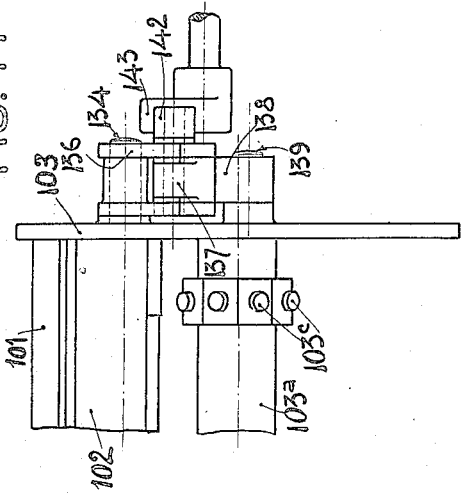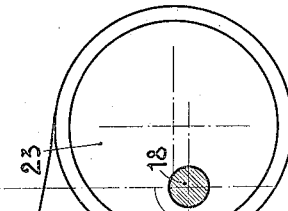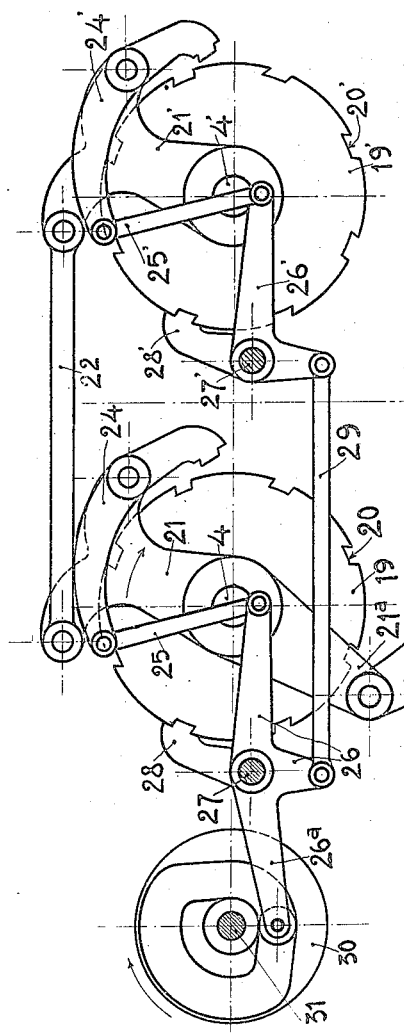

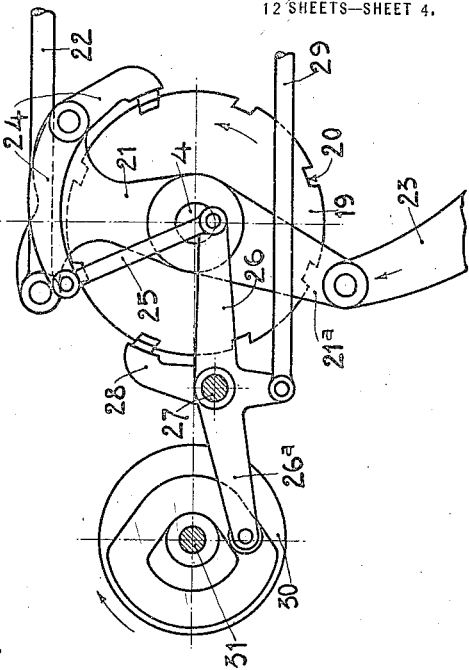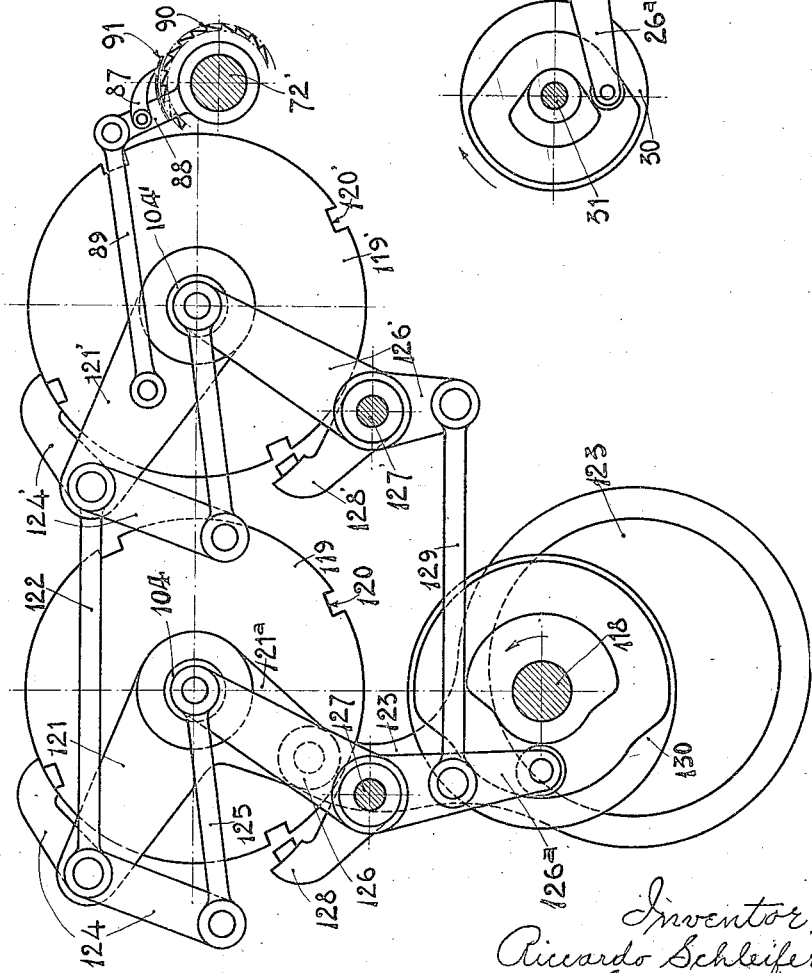

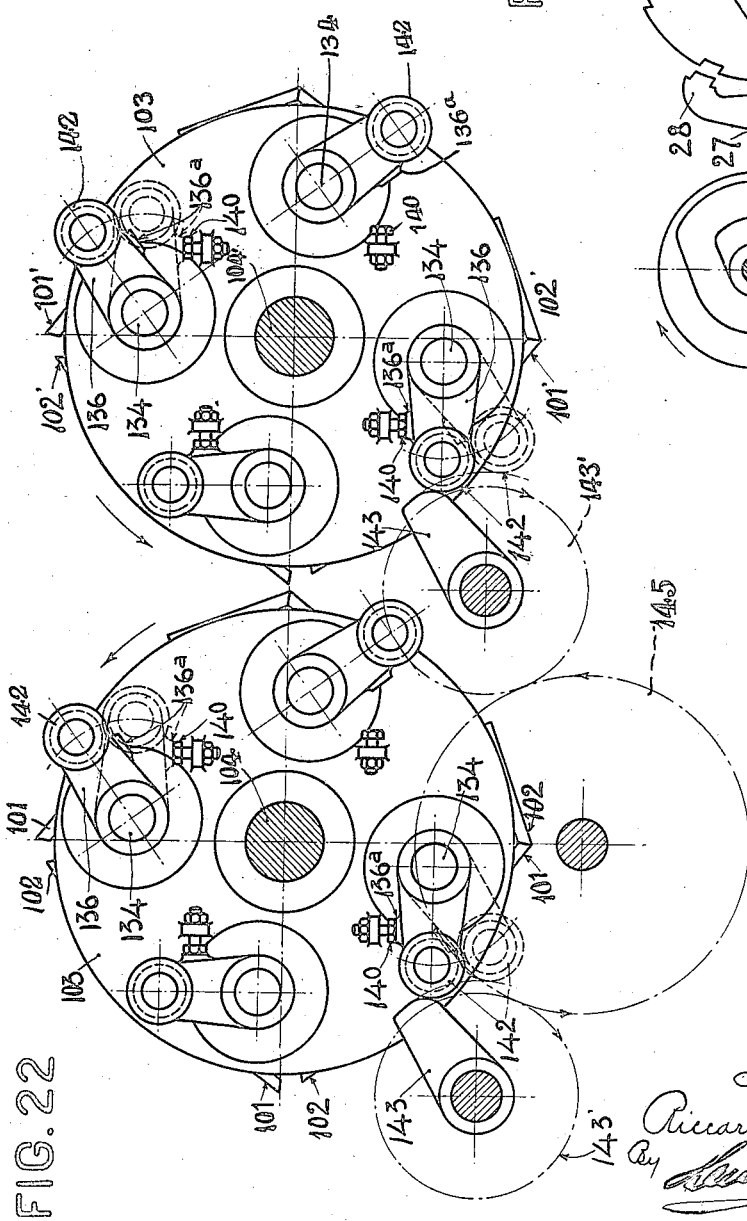

R. SCHLEIFER.
MACHINE FOR COMBING TEXTILE FIBERS.
APPLICATION FILED MAY 17, 1921.
1,425,059.
Patented Aug. 8, 1922.
12 SHEETS—SHEET 6.
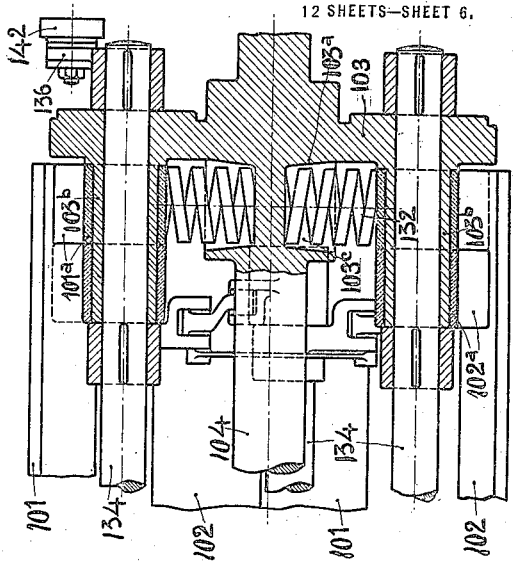
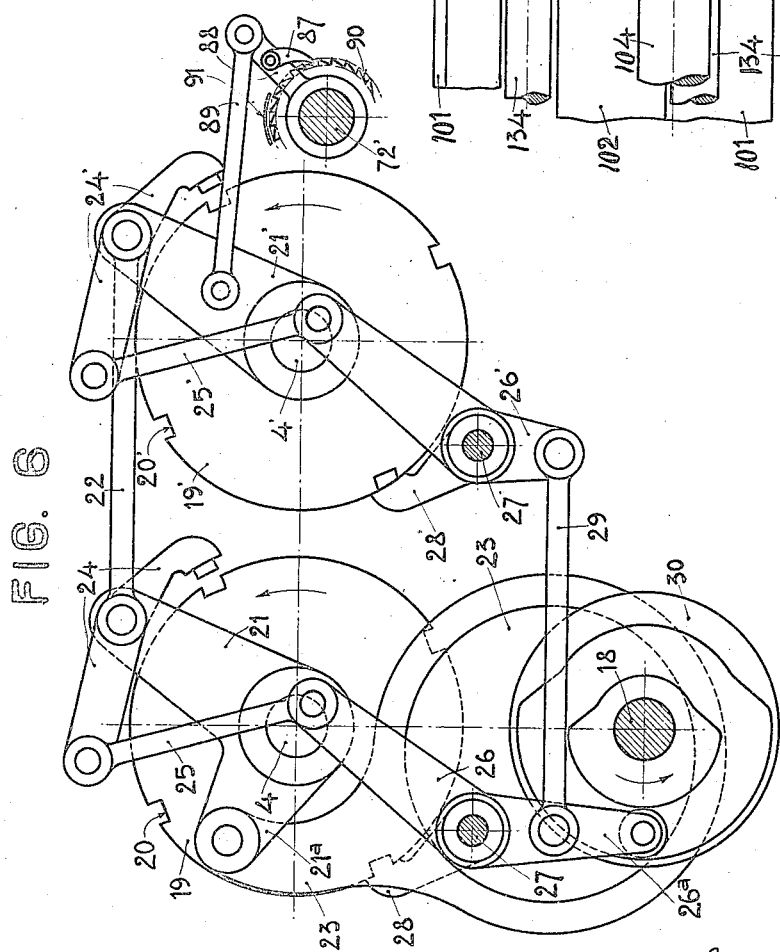
Inventor.
Riccardo Schleifer,
By [signature]
Atty.

R. SCHLEIFER.
MACHINE FOR COMBING TEXTILE FIBERS.
APPLICATION FILED MAY 17, 1921.
1,425,059.
Patented Aug. 8, 1922.
12 SHEETS—SHEET 7.
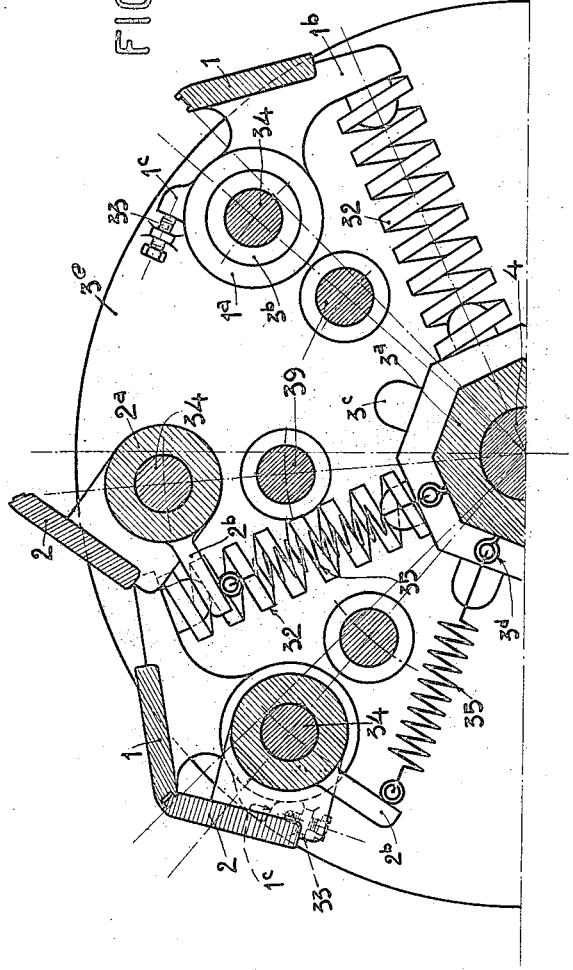
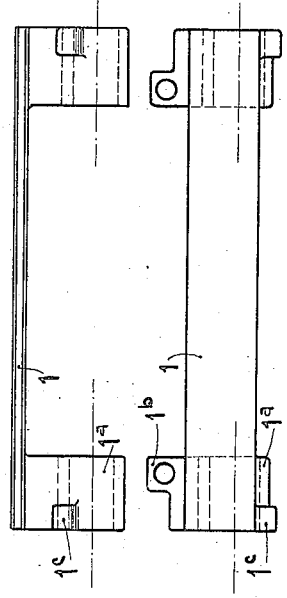
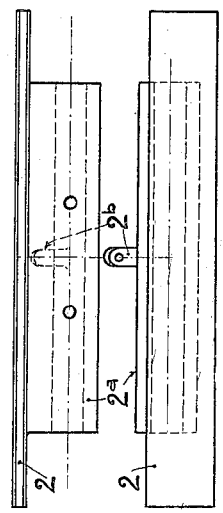
Inventor
Ricardo Schleifer R. SCHLEIFER.
MACHINE FOR COMBING TEXTILE FIBERS.
APPLICATION FILED MAY 17, 1921.

1,425,059.

Patented Aug. 8, 1922.
12 SHEETS—SHEET 8.

Inventor
Ricardo Schleifer
By [signature]
Atty.

Inventor
Ricardo Schleifer
By [signature]
Atty

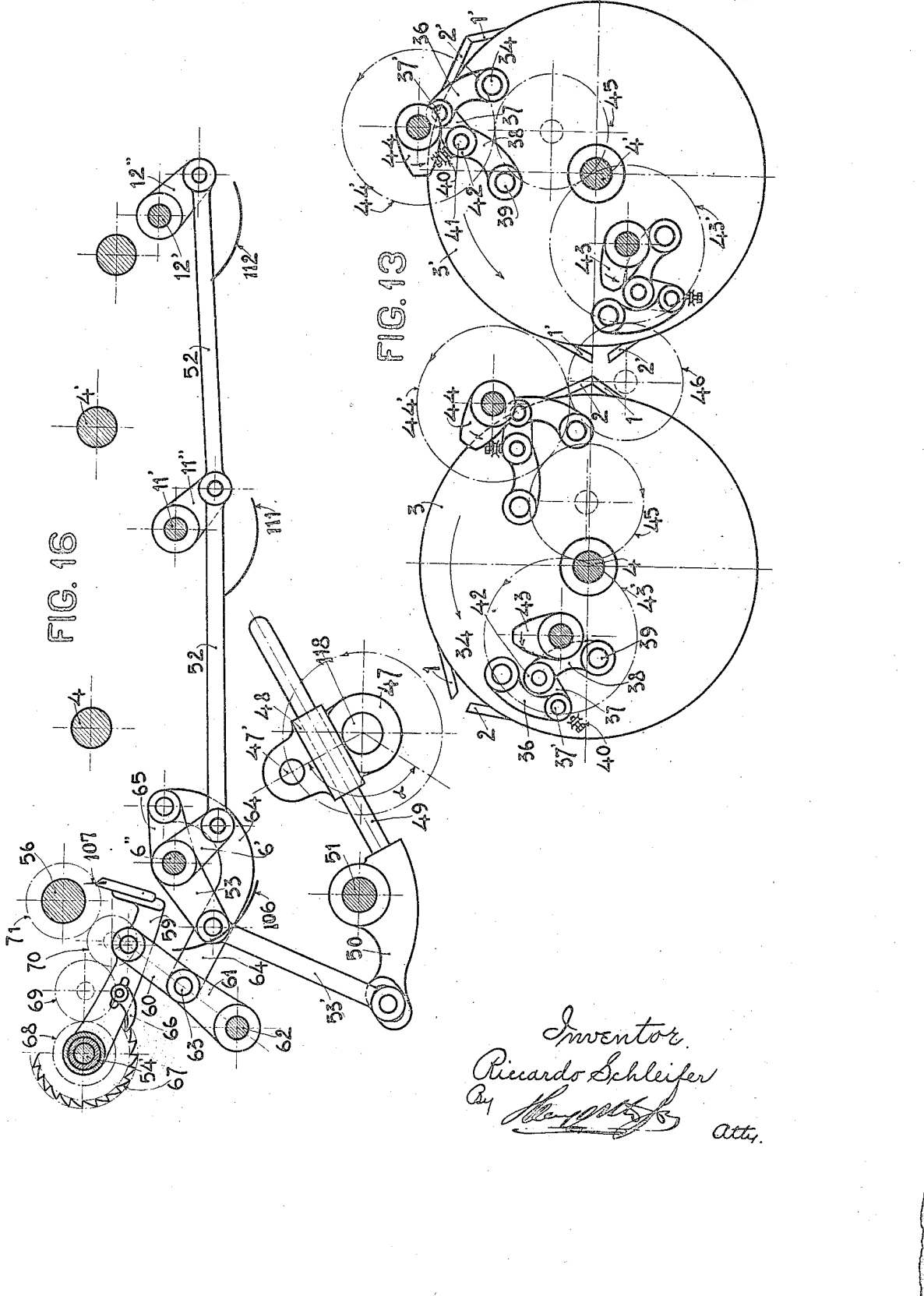

R. SCHLEIFER.
MACHINE FOR COMBING TEXTILE FIBERS.
APPLICATION FILED MAY 17, 1921.
1,425,059.
Patented Aug. 8, 1922.
12 SHEETS—SHEET 11.
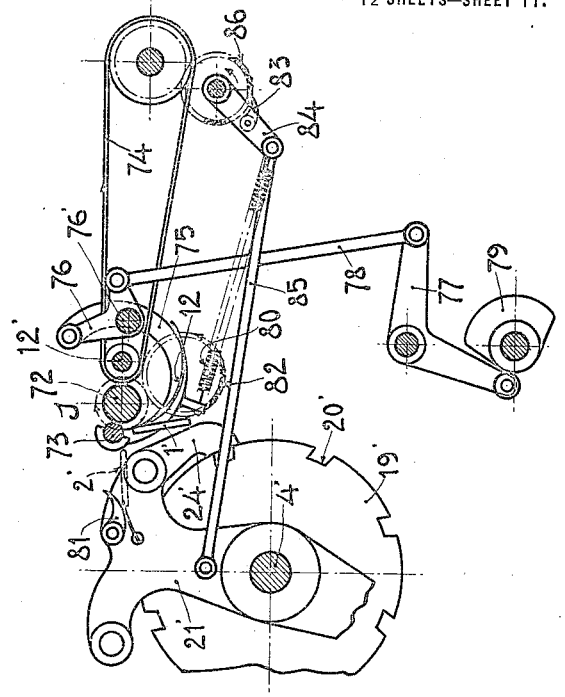
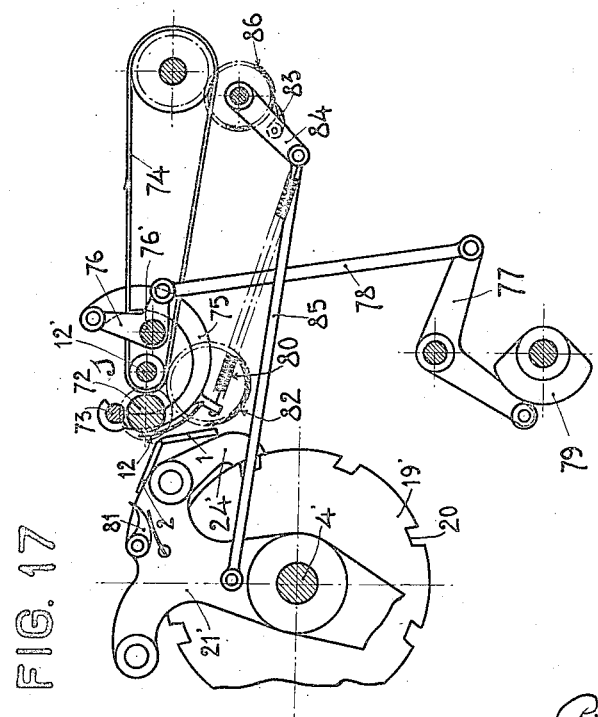

R. SCHLEIFER.
MACHINE FOR COMBING TEXTILE FIBERS.
APPLICATION FILED MAY 17, 1921.

1,425,059.

Patented Aug. 8, 1922.

UNITED STATES PATENT OFFICE.

RICCARDO SCHLEIFER, OF MILAN, ITALY.

MACHINE FOR COMBING TEXTILE FIBERS.

1,425,059.  Specification of Letters Patent.  Patented Aug. 8, 1922.

Application filed May 17, 1921. Serial No. 470,272.

*To all whom it may concern:*

Be it known that I, RICCARDO SCHLEIFER, a subject of the King of Italy, residing at Milan, Italy, have invented certain new and useful Improvements in Machines for Combing Textile Fibers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to combing machines of the type in which two or several series of nippers are provided, and in which the nippers of each series are uniformly distributed in a circle or circles upon supporting drums rotating around parallel axes with a synchronous intermittent motion, the nippers being constructed in such a manner as to be closed or opened at the desired moment for seizing and holding or for releasing when required the bunches of fibers of silk, wool, cotton and the like which are combed at both ends by means of rotary combing cylinders.

The main characteristics of a combing machine of the above mentioned type and improved according to the present invention consist in an arrangement for an intermittent driving of the drum supporting the series of nippers, in the mode of construction of the nippers themselves, in the mechanisms causing their closing and opening, in an arrangement for regulating the feed and the driving of oscillating members intended to feed the bunches of fibers into or withdraw them from the nippers, and lastly in the construction of the discharging device.

Figure 2:
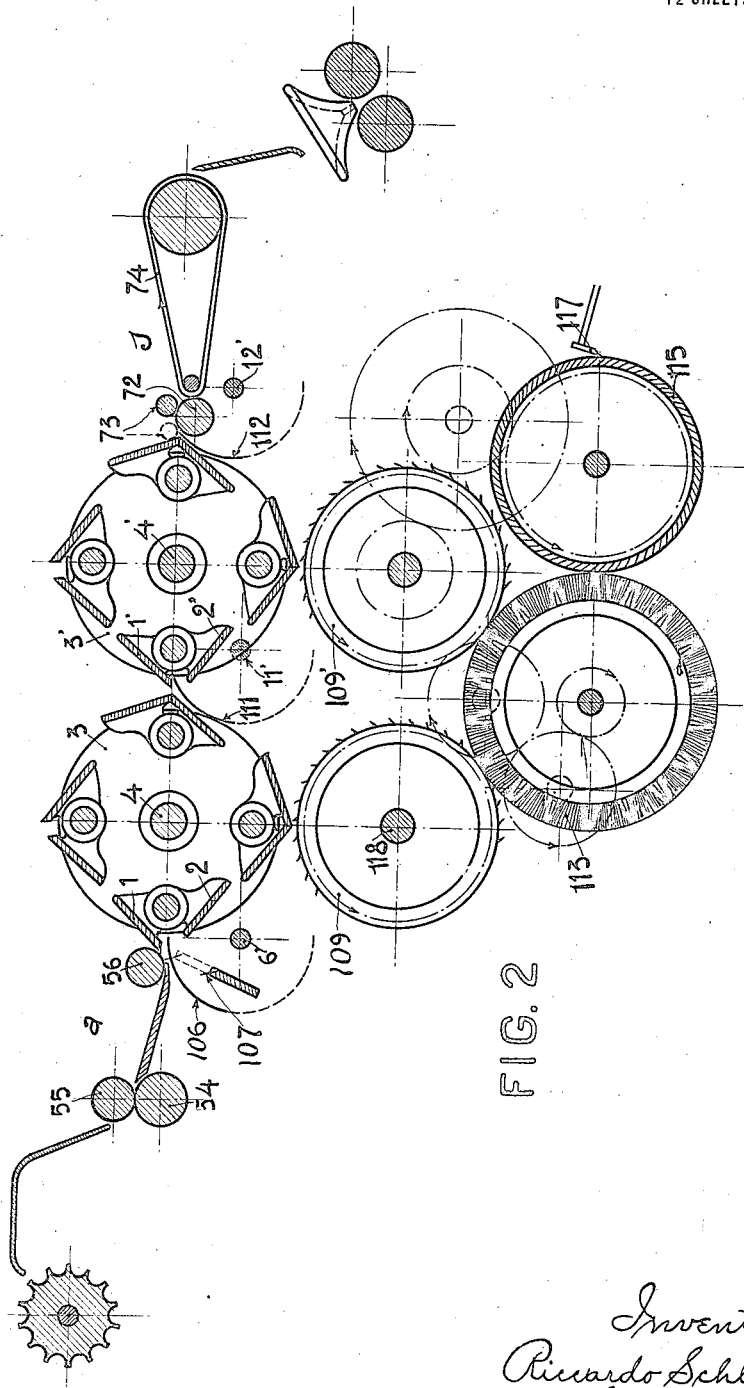
Figure 9:
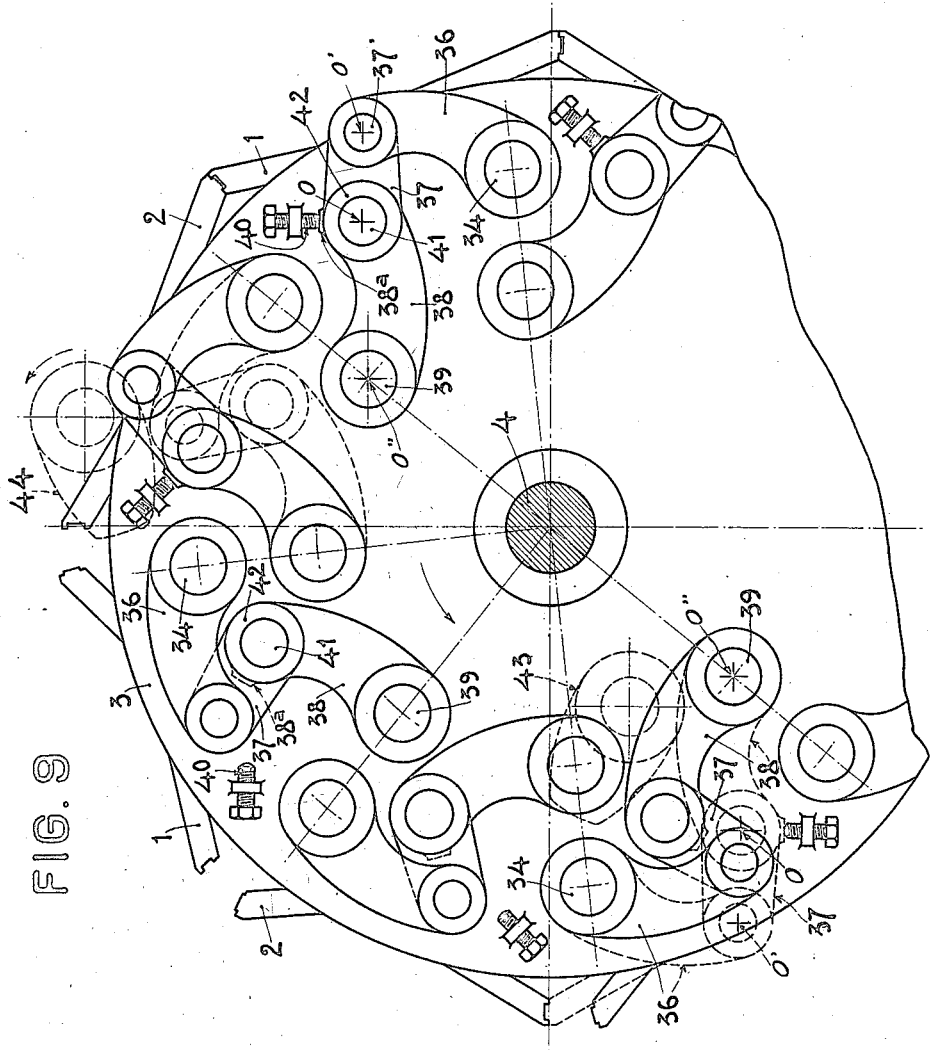
Figure 10:
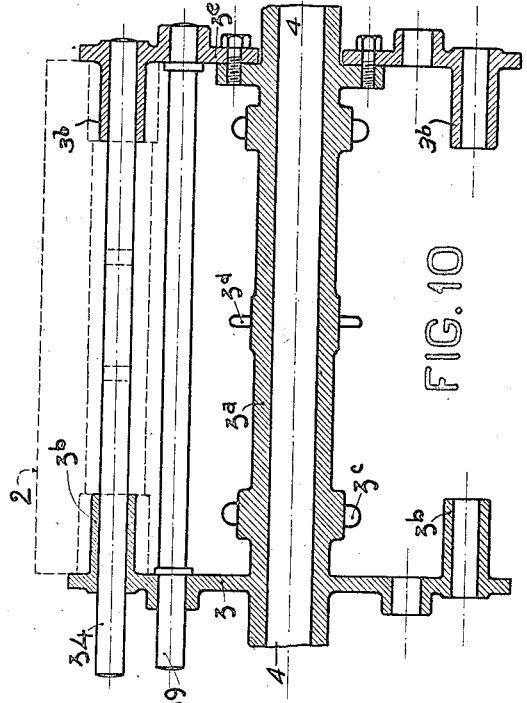
Figure 15:
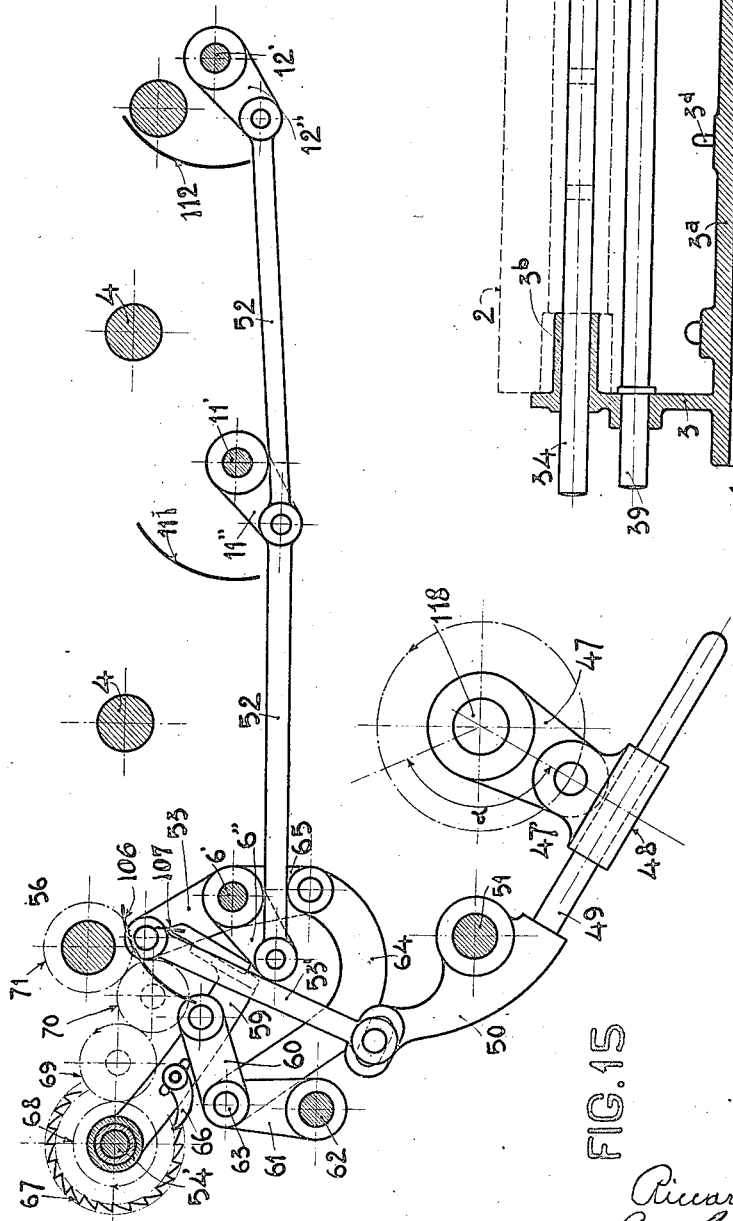
Figure 19:
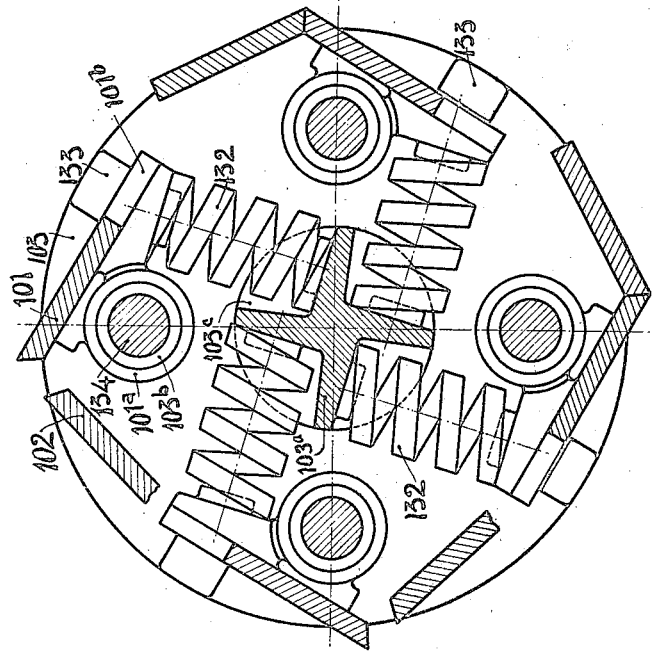
Figure 20:
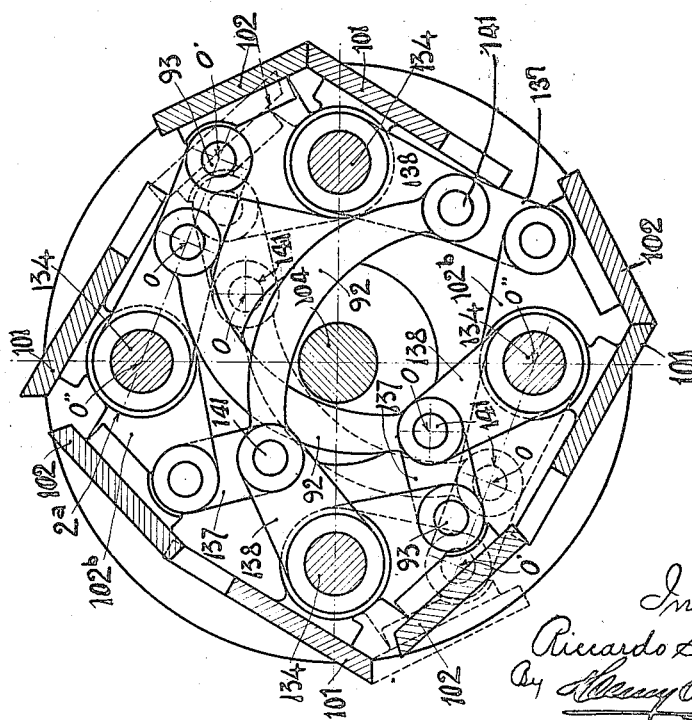

In the accompanying drawings, which illustrate by way of example a few modes of construction of a combing machine according to the present invention, Figs. 1 and 2 show diagrammatically a type of combing machine according to the present invention, Figs. 3, 4 and 5 show diagrammatically in front elevation and in various working positions, a mode of construction of an arrangement for an intermittent driving of the drums of the nippers which is more particularly suitable for a machine of the type shown in Fig. 1, Figs. 6 and 7 show another mode of construction of the said arrangement for an intermittent driving of the drums of the nippers, which is more particularly suitable for a machine of the type shown in Fig. 2, Fig. 8 is a transverse section of a drum showing a pair of nippers in the closed position and parts of the adjacent nippers in open position, Fig. 9 is an end view of a drum with controlling mechanisms for the nippers, Fig. 10 is a longitudinal section of a drum from which the nippers have been removed, Figs. 11 and 12 show in elevation and in plan view the jaws of the nippers, Figs. 13 and 14 show diagrammatically a front and a lateral elevation of an arrangement of cams for opening and closing the nippers, Figs. 15 and 16 show diagrammatically a front elevation of two different working positions of an arrangement for adjusting the feed and for operating the oscillating members for feeding or withdrawing the bunches of fibers, Figs. 17 and 18 show diagrammatically in a front elevation two different working positions of the device for discharging the bunches of fibers which have already been combed, Figs. 19 and 20 are transverse sections of a drum with four nippers and with a modified arrangement for operating the said nippers, Fig. 21 is a longitudinal section of the said drum, Fig. 22 shows diagrammatically an arrangement of cams for operating the opening and closing of the nippers of two of the said drums.

A combing machine according to the present invention is constructed and works as described hereinafter.

A machine of the type shown diagrammatically in Fig. 1, more particularly applicable to the combing of long fibers such as silk, wool and the like, comprises two series of eight nippers, 1. 2 and 1'. 2' with movable jaws, uniformly distributed on the periphery of the two drums, 3 and 3' rotating in the direction shown by the arrows on parallel shafts 4 and 4' with a synchronous, intermittent motion having an amplitude equal to the angle between two adjusting nippers. The lap 5 of fibers to be combed is fed intermittently by means of a feeding device —*a*— of a construction suitable to the nature of the fibers, to nippers of the first series during the stopping of the latter opposite the feeding device —a—. A curved blade 6 having a rapid, oscillating motion, introduces the end of the lap 5 between the open jaws of the nippers whilst a comb 7 which penetrates through the lap 5 after the nippers have closed and the movement of rotation has commenced, serves to restrict the tearing zone of the bunch 8 of fibers from the remaining part of the lap 5.

Two combing cylinders 9 and 10 rotating in opposite directions with a continuous motion, comb successively the bunch 8 on its two sides. Afterwards the bunch 8 comes opposite the opening nippers 1′.2′ of the second series and is introduced therein by means of a rapidly oscillating blade 11, whereupon the nippers 1′.2′ of the second series close, and those of the first series open. The bunch thus reversed is combed by two other cylinders 9′. 10′ which rotate in an opposite direction in a continuous manner.

Lastly, the bunch, after it has been entirely combed, comes opposite a discharging mechanism —s— with which it is brought into engagement by means of a rapidly oscillating blade 12.

The short fibers or noils which have been removed by the combing drums 9. 10, and 9′. 10′, are removed from the latter by means of pairs of brushes 13.14 and 13′.14′ and of doffers 15. 16. 15′ and 16′ from one of which the lap of noils is removed by means of oscillating combs 17. 17′.

A machine of the type shown diagrammatically in Figure 2 and which is more particularly suitable for short fibers, such as those of cotton or the like, may have a smaller number of nippers, for instance four nippers for each series; one combing cylinder only 109.109′ for each series and consequently one single brush 113 and one single doffer 115 with the oscillating comb 117 relating thereto. On the other hand, the number of series of nippers may be higher than two.

The present invention has for its object:
An arrangement for an intermittent drive of the drums of nippers,
A mechanism for the nippers and the controlling arrangement relating thereto,
A mechanism for operating the oscillating blades and for controlling the feeding device,
A discharging device.

The above parts will be described hereinafter under separate chapters.

As to the driving of the remaining members of the machine which have a continuous rotary motion, this motion is obtained in any manner by means of gear, chain or like transmissions as shown diagrammatically in Figs. 1 and 2 directly or indirectly from the main shaft 18 of the machine which in Figure 1 is shown to be independent, whilst in Figure 2 it coincides with the shaft of the combing cylinder 9.

Mechanism for an intermittent drive of the drums for carrying the nippers.

In the mode of construction which is shown in Figs. 3 to 5 and which is more particularly applicable to the type of machine shown in Fig. 1, a disc 19, 19′ is rendered integral with each drum, each disc being provided with notches 20, 20′ uniformly distributed on its periphery, the number of the notches being equal to that of the pairs of nippers.

Sectors 21.21′ coupled to each other in their motion, by means of a rod 22 are mounted on the shafts 4.4′ of the drums in such a manner as to be capable of oscillating, one of the said sectors, namely 21 being actuated with an oscillatory motion by means of an eccentric 23, driven by the main shaft 18 and linked to the tail —21ᵃ— of the sector 21.

A driving pawl 24. 24′ pivoted to each sector, is intended to come into engagement with the notches 20.20′, each of the said pawls being linked by means of rods 25.25′ to right-angled levers 26.26′ rigidly mounted on the shafts 27.27′ on which are also rigidly mounted the other locking pawls 28. 28′ intended to engage with the notches 20.20′ when the pawls 24.24′ have become disengaged from the said notches and viceversa. The right angled levers 26.26′ are interconnected by means of a rod 29 whilst the tail —26ᵃ— of the lever 26 engages with a notch of a suitably-shaped cam 30 rigidly mounted on a shaft 31, rotating with a speed equal to that of the main shaft 18.

Owing to the above arrangement, when the various members are in the position shown in Figure 3, the locking pawls 28.28′ engage with the notches of the discs 19.19′, lock the drums of the nippers whilst the disengaged pawls 24.24′ effect together with the sectors 21.21′ their return oscillation to the position shown in Figure 5, in which owing to the position acquired by the cam 30, the pawls 28.28′ are disengaged and vice-versa, the pawls 24.24′ engage in the notches of the disc 19.19′. Successively when the sectors 21.21′ effect their oscillation in one direction, the pawls 24.24′ drive the drums of the nippers until the whole arrangement comes into the position shown in Figure 4 and the cam 30 causes the disengagement of the pawls 24.24′ from the notches of the discs 19.19′, and on the contrary an engagement of the locking pawls 28.28′ with the said notches. Consequently, during the successive return oscillations of the sectors 21.21′ which has already commenced in the position shown in Figure 3 and which continues until the position shown in Figure 5 is reached, the drums remain stationary.

It follows that for each revolution of the shaft 18, the drums of the nippers effect an intermittent rotation in the desired direction, which rotation will be exactly equal to the angle between two nippers, if the eccentricity of the eccentric 23 and the dimensions of the oscillating sectors and of the other elements of the above-described cinematic arrangement have been suitably chosen.

The cam 30 may be placed on the same main shaft 18, on which the eccentric 23 is mounted instead of being placed on an independent shaft 31.

This modification is shown in the example of Figures 6 and 7 which illustrate two separate working phases of the arrangement for an intermittent drive of the drums of the nippers.

In Figs. 2, 6, 7, 14, 16, 19, 20, 21 and 22, similar parts or parts corresponding to those of Figure 3, have been marked with the same reference characters except that one hundred has been added to said characters.

The working is entirely similar to that of the arrangement shown in Figure 3, only in the case of Figs. 6 and 7, the intermittent movement of the drums has an amplitude of 90°, which is obtained by suitably choosing the dimensions of the elements of the cinematic arrangement.

The driving mechanism above described, may of course serve even in the case when there are more than two drums for nippers, because rods similar to the rods 22 and 29 may serve to transmit the same motions to any number of successive drums.

*Mechanism of the nippers and driving mechanism relating thereto.*

The frame of each drum of nippers consists for instance (see Fig. 10) of two heads, one of which 3 is integral with the hub —3ª— intended to be secured on the shaft 4 and the other 3ᵉ being removably attached thereto.

The jaws of the nippers consist substantially of two rectangular plates 1, 2, longitudinally arranged in the direction of the generating lines of the drum and their length being suitably chosen in order that they shall be held between the two heads 3 3ᵉ.

Each jaw 1 (see Figure 12) is provided at the lower part with sleeves —1ª— by means of which it is mounted so as to be capable of freely oscillating upon the sleeves —3ᵇ— of the heads 3 3ᵉ; the said sleeves —1ª— have end projections —1ᵇ— which are acted upon by the pressure springs 32 (see Figure 8) bearing at the other end against the projections —3ᶜ— of the hub —3ª—; the said springs constantly press the jaw 1 against its companion jaw 2 as shown at the left-hand side of Fig. 8. However, since in the open position jaw 1 cannot abut against the companion jaw 2, it bears with the projections —1ᶜ— of its hubs —1ª— against the adjustable stops 33 fixed inside the heads 3 3ᵉ. Each jaw 2 (see Fig. 11) is provided at the lower part with a sleeve —2ª—, by means of which it is secured on the shaft 34, rotatably mounted between the sleeves —3ᵇ— of the heads 3 3ᵉ and passing through the head 3.

A tensioning spring 35 secured at one end to a projection —2ᵇ— of the sleeve —2ª— and at its other end to an eye —3ᵈ— integral with the hub —3ª— has a tendency to keep the jaw 2 in the open position.

A lever 36 is rigidly mounted on that portion of the shaft 34 that projects from the fixed head 3, which lever is linked by means of a small connecting rod 37 to another lever 38 rigidly mounted on the end of a shaft 39 mounted so as to be capable of oscillating between the heads 3 3ᵉ of the drum and projecting also beyond the fixed head 3 (see Figs. 9 and 10). The linked mechanism 36, 37, 38 may have two different positions of equilibrium, the locking position to which corresponds the closing of the nippers shown for the two first nippers on the righthand side of Figure 9, or the breaking position, to which corresponds the opening of the nippers, shown for the remaining nippers on the left hand side of the same Figure 9.

By bringing the said linked mechanism in the locking position, the tension of the spring 35 is overcome and the jaw 2 is brought against the jaw 1 until the reaction of the spring 32 is also overcome and the said jaw 1 is caused to oscillate slightly backwards, and its projections 1ᶜ are slightly retracted from the adjustable stops 33 (see dotted lines at left hand side of Figure 8). The equilibrium of the linked mechanism 36.37.38 in its locking position is thus ensured owing to the projection —38ª— of the lever 38 bearing against the stop 40 adjustably mounted on the head 3, the said stop being adjusted in such a manner that the centre —o— of the pivot 41 of the toggle-joint of the small connecting rod 37 and the lever 38 becomes placed on the straight line —o'.o"— joining the centres of the shaft 39 and of the pivot 37' of the toggle-joint between 36 and 37, or even better that it shall be slightly displaced towards the stop 40. Then the resilient reaction of the spring 35 which has a tendency to open the jaw 2, is annulled against the stop 40, whilst the reaction of the spring 32 is annulled against the jaw 2, thereby exerting the pressure which is required for holding the bunch of fibers inside the nippers. In order to produce the opening of the nippers, it is sufficient to break the position of equilibrium above described by slightly displacing the centre —o— on the other side of the line o'.o". Then the whole linked mechanism is brought by a sudden release into the opening position under the action of the spring 35, whilst the jaw 1 returns to its position of rest against the stops 33 under the action of the spring 32.

The opening and closing positions of the levers are controlled by means of cams acting in one direction or the other upon a roller 42 rotatably mounted upon an extension of the pivot 41 of the toggle-joint between the small connecting rod 37 and the lever 38. The said controlling arrangement, shown diagrammatically in front elevation in Figure 13 and in a lateral elevation in Figure 14, comprises four cams 43, 43, and 44, 44 respectively operating the closing and opening, which cams are arranged in a suitable position in the path of the rollers 42, and are operated in rotation in the required direction by means of a gear transmission 43',44' and intermediate wheels 45 operated by a wheel 46 driven at a suitable speed by the main shaft of the machine, in such a manner that the cams shall rotate with the same speed as the said main shaft.

The cams 43 act from the inside upon rollers 42 of the linked mechanism 36.37.38, in its breaking position of the opened nippers 1.2 of the first series situated opposite the feeding device and also of the nippers 1'.2' of the second series situated opposite the closed nippers 1,2 of the first series. The action of the said cams is such that the rollers 42 are forced to the outside and the points o.o'.o'' are thus brought in line with each other as shown in dotted lines in Figure 9, thus effecting the closing of the nippers which have been considered.

The cams 44 act on the contrary from the outside upon rollers 42 of the linked mechanism 36.37.38, in its locking position, of the closed nippers 1,2 of the first series situated opposite the open nippers 1'.2' of the second series, and of the closed nippers 1'.2' of the second series situated opposite the discharging device. The action of the said cams 44 is such that the rollers 42 are forced towards the inside, thereby destroying the equilibrium of the locking position of the linked mechanism and causing the breaking of the said mechanism as shown in dotted lines in Figure 9; the nippers opening suddenly.

The mechanism of the nippers and their driving mechanism described above with reference to Figures 8 to 14, is more particularly applicable to the type of machine shown diagrammatically in Figure 1. In the case of a machine of the type shown diagrammatically in Figure 2, according to which each drum has four nippers only, the mechanism of the nippers and the driving mechanism relating thereto, have preferably a modified form as shown in Figures 19 to 22.

According to the said modified form, the linked mechanisms which operate two diametrically opposite nippers, are coupled together in such a manner that when one is placed in an opening position, the other is placed in the closing position and vice-versa, and this precisely as required for nippers of a machine of the type shown in Figure 2.

According to the said modified form (see Figs. 19 to 21, the semi-fixed counter-jaws 101 are always mounted so as to be capable of oscillating freely by means of their sleeve 101$^a$ on the sleeve 103$^b$ of the heads 103 of the drum, the said sleeves 101$^a$ having projections 101$^b$ which are acted upon by the pressure springs 132 which act on the other side on the bottom of the cavities 103$^c$ of the hub 103$^a$.

The springs 132 constantly press the counter-jaw 101 towards the movable jaw 102 only, since in the opening position, the counter-jaw does not abut against the companion jaw 102 but it abuts with its tail 101$^b$ against the stops 133 provided on the head 103, which stops may be rendered adjustable if necessary as in the case of the mode of construction previously described with reference to the Figure 8.

Each jaw 102 is rotatably mounted by means of its end sleeves 102$^a$ on the sleeves 103$^b$ of the heads 103 whilst the shaft 134 passes through each co-axial pair of sleeves 103$^b$, the said shaft being capable of rotating freely and projecting beyond the head 103.

A command lever 138 is rigidly mounted on each shaft 134 inside the drum, which lever is linked by means of a connecting rod 137 to the tail 102$^b$ of the movable jaw 102.

The pivot 141 of the articulation between the lever 138 and the corresponding small connecting rod 137, is connected by means of a rod 92 to another corresponding pivot 141 of the linked mechanism for operating the movable jaw situated diametrically opposite.

The four linked mechanisms operating the four nippers are thus interconnected two by two by means of rods 92. The length of each of the rods is chosen in such a manner that when one of the two linked mechanisms which are coupled together, is in the closing position, the other one shall be in the breaking or opening position.

A control lever 136 is secured on the portion of the shaft 134 projecting beyond the head 103 of the drum, the said control lever being provided at its end with a roller 142 against which acts the controlling cam 143 (see Figure 22) intended to operate at the desired moment the closing or opening of the corresponding nippers.

In this case, the operation of the opening or closing of the nippers is effected for each drum by means of one cam only 143, whilst the cams 143 of the said drums are operated in rotation, for instance, by means of a gear 145 engaging with gears 143' rigidly mounted on the shafts of the two cams 143 (see Fig. 22).

Each linked mechanism 137, 138 may take two separate positions of equilibrium. The first one is the closing position, in which the centre —o— of the pivot 141 of the small connecting rod 137 is placed on the line —o'.o"—, or (what is even better, slightly displaced to the outside) joining the centres of oscillation of the shaft 134 and of the other pivot 93 of the small connecting rod 137.

The second position is the opening or breaking position in which the said centre —o— is displaced from the line —o'.o"— towards the axis of rotation of the drum, and consequently the levers 137.138 are inclined towards the said axis of rotation. The two positions of equilibrium for the two linked mechanisms of two nippers are reciprocal in that the said mechanisms are coupled together by means of the rod 92. The two positions of equilibrium are limited by the stop of the projection 136ᵃ of the lever 136 corresponding to the open nipper, against the adjustable stop 140 relating thereto, integral with the head 103 (see Fig. 22).

The working of the above described arrangement is as follows:—

When the cam 143 rotates in the direction indicated by the arrow (Fig. 22) it acts upon the roller 142 of one of the controlling levers 136 and moves the latter from the position shown in full lines to the position shown in dotted lines. The counter jaw 101' being directly controlled by the lever 136 is brought from the open position into the closed position.

When the movable jaw 102 is closed on the counter-jaw 101, the latter is caused slightly to oscillate to the rear against the resilient reaction of the spring 132 relating thereto. The said resilient reaction which serves to retain between the jaws of the nippers the bunch of fibers to be combed, is forced against the stop 140 of the projection 136ᵃ of the control lever of the jaw which is open.

*Mechanism for operating the oscillating blades and for controlling the mechanism of the feeding device.*

This mechanism which is illustrated in Figures 15 and 16 in its application to a machine of the type shown in Figure 2, is operated by means of an eccentric with a sliding block driven by the main shaft 118 and consisting of a crank 47 secured on the shaft 118, at the end of which an eccentric sleeve 48 is linked so as to be capable of oscillating freely around 47', a rod 49 being mounted inside the said sleeve so as to be capable of sliding and eccentrically oscillating around a fixed pivot 51. During the rotation of the crank 47, the rod 49 and therefore the arm 50 oscillate between the two end positions marked in Figs. 15 and 16. The oscillating blades 106, 111 and 112 which should oscillate simultaneously, are connected in any suitable manner to their shafts of oscillation 6'.11'—12', on which cranks 6".11".12" are keyed, whilst the said cranks are coupled to each other in their movement by means of rods 52. A crank 53 is keyed on the shaft 6' of the first oscillating blade, which crank is connected to the end of the arm 50 of the eccentric by means of a rod 53'. Owing to this arrangement, for each rotation of the main shaft 118 in the direction indicated by the arrow, all the blades oscillate simultaneously from the inactive position shown in Figure 16 to the active position shown in Fig. 15 and this with a very rapid movement, and return afterwards with a slower movement to the position shown in Fig. 16. The difference in rapidity between the forward and backward movement required for a good working of the said blades is obtained by the fact that the forward stroke is accomplished during a rotation —α— less than 180° of the shaft 118, whilst the backward stroke is effected during the remaining part of the revolution.

In view of the construction of the eccentric with sliding block above described, the smaller the distance between the oscillating pivot 51 and the shaft 118, the smaller is the angle —α—, so that by suitably choosing the said distance, it is possible to adjust at will the speed of the forward stroke of the above-mentioned blades.

The mechanism for operating the oscillating blades, controls also the feeding device in that it produces at the desired moment the actuating of the rectilineal comb 107, serving to restrict the tearing portion of the bunch of fibers from the lap of fibers, and moreover it operates in an intermittent manner the roller 54 which together with the pressing roller 55 (see Figure 2) causes the lap of fibers to advance; lastly the feeding roller 56 of the feeding table of a machine of the type shown in Figure 2. Indeed, the comb 107 is supported by means of the arm 59, so as to be capable of oscillating on the shaft 54' of the advance roller 54 whilst the arm 59 is supported by the two levers 60, 61, the first one being linked to the arm 59 and the other to the fixed pivot 62, the said levers being linked to each other at 63, whilst an arm 64 linked at one end at 63 and at its other end to a crank 65 keyed on the shaft 6' serve for operating the comb.

Indeed, owing to the said arrangement, when the oscillating blades are brought into their position of action (Fig. 15) the comb 107 is lowered; when on the contrary the said oscillating blades come into the position of action (Fig. 16) the comb 107 is raised until it comes against the feeding roller 56 and engages with the lap of fibers from which the bunch of fibers will be torn.

It should be pointed out that when the said tearing takes place (Fig. 16), the levers 60.61 are in a line with each other and constitute, although they are linked to each other, a rigid system which holds rigidly the comb 107 in its raised position in spite of the rather considerable effort which is exerted on the said comb in a direction such that it should be lowered during the tearing of the bunch of fibers. During the return stroke of the comb 107 from the position shown in Figure 16 to that shown in Figure 15, the pawl 66 integral with the arm 59 engages with the ratchet wheel 67 integral with the shaft 54' of the advance roller 54 and causing its intermittent rotation. Owing to this, the lap of fibers moves along. Simultaneously, owing to the gear wheels 68, 69, 70, 71, the first one being integral with the shaft 54' and the last one with the feeding roller 56, the latter is caused to rotate and feeds a new portion of the lap of fibers to be combed.

In the application of the above arrangement to a type of machine as shown in Figure 1, the mechanism for operating the oscillating blades, the comb 7 and the advance roller 54, remains the same. In this type of machine, there is not generally a feeding roller 56, which in view of the nature of the fibers to be treated is replaced by a feeding box 57, with needles of the usual type (see Fig. 1), as used with Heilman, Nasmith and other combing machines. Nothing prevents however from operating the said box with needles in an intermittent manner directly or indirectly by means of an eccentric with a sliding block which serves to operate the whole of the above-described arrangement.

*Discharging device.*—This discharging device as shown diagrammatically in Figs. 1 and 2, comprises a roller 72 upon which the bunch of fibers entirely combed is pressed by the oscillating blade 12 and by the pressing roller 73, which, once the bunch of fibers pressed against the roller 72, revolves on the latter, which is held fixed, until it reaches the position shown in dotted lines, thus seizing the bunch of fibers. Afterwards when the nippers, which hold the bunch of fibers, open, the roller 72 turns in the direction shown by the arrow whilst the pressing roller 73 returns to its initial position without being subjected to any relative movement of rotation relatively to the roller 72.

The bunch of combed fibers thus carried on the endless belt 74, to which an intermittent motion is imparted, is superposed to the bunches of fibers which have been previously combed and which are conveyed by the belt. The lap of combed fibers is removed from the endless belt 74 in any suitable manner.

Figs. 17 and 18 illustrate diagrammatically in two working positions, the cinematic members intended to operate the various elements of the discharging mechanism. The pressing roller 73 is mounted so as to be capable of rotating on the end of a curved arm 75 linked at the other end to the right-angled lever 76, pivoted at 76' and operated through the intermediary of the bell-crank lever 77 and of the rod 78 by means of an eccentric 79 rotating with the same speed as that of the main shaft of the machine by which it is operated. The roller 73 is pressed upon the roller 72 by means of a tensioning spring 80 acting upon the arm 75. The intermittent rotation of the roller 72 is obtained by means of a pawl 81 carried by the oscillating sector 21' operating the drum of the last series of nippers, which towards the end of the oscillation of the sector engages with the ratchet wheel 82, which by means of gears operates the roller 72. The endless belt 74 is operated in an intermittent manner by means of a pawl 83 of the oscillating lever 84 actuated by a rod 85 connected to the oscillating sector 21' and engaging with the ratchet wheel 86 which by means of the gear wheels operates the rear roller supporting the belt 74, while the pivot of the front roller supporting the said belt coincides with the shaft 12' of the oscillating blade 112.

The working of the above device is as follows:—

When the bunch of fibers entirely combed comes opposite the discharging device (Fig. 17) the oscillating blade 12 presses the bunch upwards, so that the latter comes against the roller 72. The pressing roller 73 operated by the eccentric 79 is then displaced on the roller 72 which remains fixed, and seizes the bunch whilst the nippers 1'.2' open (see Fig. 18). Afterwards during the oscillation of the sector 21', the pawl 81 causes the rotation of the roller 72 in the direction indicated by the arrow (Fig. 18), whilst at the same time, the pressing roller 73 is brought back by the eccentric 79 to its initial position shown in Fig. 17 so that there is no rotation of the roller 73 relatively to the roller 72. The bunch of fibers is thus carried towards the endless belt 74 which in the meantime has been subjected to a movement of translation owing to the motion to which the pawl 83, operated by the rod 85, has been subjected. The bunch of fibers is thus partially superposed to the last bunch previously discharged, and forms a lap of combed fibers, which is afterwards removed from the endless belt by any suitable means.

The intermittent driving of the various members of the discharging device may be effected with other cinematic elements than those above described; for instance in a machine of the type shown in Figure 2, the operation of the roller 72 of the discharging device may be effected as shown in Figures 6 and 7, by means of a pawl 87 carried by the arm 88 pivoting on the pivot 72' of the roller 72 actuated by a rod 89 linked to the sector 121', the said pawl, engaging with the ratchet wheel 90 integral with the said roller 72. In order to limit if necessary, the amplitude of the angular rotation of the roller 72, a diaphragm 91 may be used intended to bring the pawl 87 out of engagement with the teeth 90 during a part of the travel. The same intermittent movement of 90 may be used for imparting by means of gears, an intermittent motion to the conveying belt 74.

I wish it to be understood that the details for carrying the invention into effect, may be modified in various respects without in any way departing from the spirit of the invention.

I claim—

1. In a machine for combing textile fibers, a plurality of rotary drums, a notched driving member fixed on each drum, a carrier mounted on the shaft of each drum, means for oscillating the carriers, a driving pawl mounted on each carrier adapted to engage the notches of the driving member, a locking pawl for each drum adapted to engage said notches, means connecting the locking pawls together, means for oscillating the locking pawls, and means actuated by the movement of locking pawls for oscillating the driving pawls on the carriers, whereby the driving and locking pawls alternately engage the notches of the driving members during the oscillation of the carriers in one direction or the other so as to effect alternately an intermittent driving and locking of the drums.

2. In a machine for combing textile fibers, a plurality of drums carrying the fiber nippers, a driving member fixed on each drum having notches corresponding to the number of nippers on each drum, a carrier pivoted on the shaft of each drum, a driving shaft, an eccentric thereon, means operated by the eccentric for oscillating the carriers, a driving pawl pivotally mounted on each carrier, and adapted to engage the notches on the driving member, an oscillating shaft adjacent each drum, a locking pawl fixed on each oscillating shaft, means connecting the oscillating shafts with the driving pawls adapted to actuate the latter in unison, an arm for actuating the oscillating shafts, and a cam for moving the arm whereby the driving and locking pawls are actuated to alternately effect an intermittent driving of the drum, and a locking of the latter during the periods of rest.

3. In a machine for combing textile fibers, a plurality of drums carrying the fiber nippers, a driving member fixed on each drum having notches corresponding to the number of nippers on each drum, a carrier pivoted on the shaft of each drum, a driving shaft, an eccentric thereon, means operated by the eccentric for oscillating the carriers, a driving pawl pivotedly mounted on each carrier and adapted to engage the notches on the driving member, an oscillating shaft adjacent each drum, a locking pawl fixed on each oscillating shaft, means connecting the oscillating shafts with the driving pawls adapted to actuate the latter in unison, an arm for actuating the oscillating shafts, and a cam on the driving shaft for moving the arm whereby the driving and locking pawls are actuated to alternately effect an intermittent driving of the drum, and a locking of the latter during the periods of rest.

4. In a machine for combing textile fibers, a plurality of drums, means for intermittently rotating the latter, a plurality of pairs of nippers carried by the drums for seizing and releasing the fibers, each pair comprising a movable jaw, a spring actuated counter jaw cooperating with the latter, a stop mounted in the path of the counter jaw, a rock shaft carrying the movable jaw, toggle levers connected with the rock shaft, and rotating cams for actuating the toggle levers, whereby the movable jaw is rocked into and out of operative relation with the counter jaw.

5. In a machine for combing tertile fibers, a plurality of drums, means for intermittently rotating the latter, a plurality of pairs of nippers carried by the drums for seizing and releasing the fibers each pair comprising a movable jaw and a counter jaw, a stop mounted in the path of the latter, means for yieldingly holding the counter jaw against said stop, a rock shaft carrying the movable jaw, a lever for actuating the rock shaft, a controlling lever pivoted on the drum, a link connecting the actuating and control levers, a stop in the path of the controlling lever for holding the latter and link in position for locking the actuating lever and movable jaw in the closed position, and cams for moving the controlling lever into and out of locking position for opening and closing the jaws.

6. In a machine for combing textile fibers, a plurality of drums, means for intermittently rotating the latter, a plurality of pairs of nippers carried by the drums for seizing and releasing the fibers, each pair comprising a movable jaw and a counter jaw, a stop mounted in the path of the latter, means for yieldingly holding the counter jaw against said stop, a rock shaft carrying the movable jaw, a lever for actuating the rock shaft, a controlling lever pivoted on the drum, a link connecting the actuating and control levers, the center of rotation of the controlling lever and the centers of rotation of the link being movable into substantially the same plane for locking the actuating lever, a stop for limiting the movement of the controlling lever, and rotating cams for moving the latter into and out of locking position for opening and closing the nippers.

7. In a machine for combing textile fibers, a rotatable drum, means for intermittently rotating the same, a plurality of nippers carried by the drum each comprising a rock shaft, a jaw fixed on the latter, a spring urged counter jaw pivoted on the rock shaft and movable independently thereof, a stop on the drum to limit the movement of the counter-jaw, an actuating lever fixed on the rock shaft, toggle levers connected to the actuating lever for oscillating the latter, and means for actuating the toggle levers of two diametrically opposite pairs of nippers whereby one of the pairs is in its opening position and the other pair in its closing position.

8. In a machine for combing textile fibers, a rotatable drum, means for intermittently rotating the latter, a plurality of rock shafts mounted in the drum, a plurality of nippers each comprising a jaw fixed on one of said shafts, means for yieldingly holding the jaw in open position, a counter jaw, a stop on the drum in the path of the counter jaw, a spring for yieldingly holding the counter jaw against said stop when the nippers are in open position, an actuating lever fixed on the rock shaft, a pivoted control lever, a link for locking the actuating and control levers, a stop on the drum in the path of the control lever adapted to maintain the link in position for locking the levers when the jaws are closed, and means for moving the link into and out of locking position.

9. In a machine for combing textile fibers, a rotatable drum, means for intermittently rotating the latter, a plurality of rock shafts mounted in the drum, a plurality of nippers each comprising a jaw fixed on one of said shafts, means for yieldingly holding the jaw in open position, a counter jaw, a stop on the drum in the path of the counter jaw, a spring for yieldingly holding the counter jaw against said stop when the nippers are in open position, an actuating lever fixed on the rock shaft, a pivoted control lever, a link for locking the actuating and control levers, a stop on the drum in the path of the control levers, adapted to maintain the link in position for locking the levers when the jaws are closed, a plurality of rotary cams, adapted to act upon said links, means to impart a complete rotation of the cams at each working phase of the nippers, to open and close the latter.

10. In a machine for combing textile fibers, a rotatable drum, a driving shaft, a plurality of nippers, carried by the drum for seizing and releasing the fibers, a plurality of pivoted blades for introducing and removing the fibers into and from the nippers, mechanism for intermittently actuating the blades comprising a crank on the driving shaft, a lever pivoted between its ends and having one end in sliding connection with the crank, crank arms connected with the blades, and means connecting the crank arms with the free end of the lever adapted to oscillate said arms and blades.

11. In a machine for combing textile fibers, a rotatable drum, a driving shaft, a plurality of nippers, arranged in pairs on said drum for seizing and releasing the fibers, a plurality of pivoted blades for introducing the fibers into the nippers and removing them therefrom, mechanism for intermittently oscillating the blades comprising a crank fixed on the driving shaft, a lever pivoted between its ends and having one end in sliding connection with the crank, oscillatory shafts carrying the blades, crank arms fixed on the oscillatory shafts, a rod connecting the crank arms, and links connecting the rod with the free end of the lever.

12. In a machine for combing textile fibers, a rotatable drum, a driving shaft, a plurality of nippers carried by the drum for seizing and releasing the fibers intermittently, a plurality of oscillatory shafts, blades carried by the latter for introducing the fibers into the nippers and removing them therefrom, a crank fixed on the driving shaft, a lever rocked by the crank, means connecting the lever and oscillatory shafts, a rotary shaft, a comb, a pivoted arm carrying the comb, toggle-levers connected with the pivoted arm, means connecting the toggle levers with one of the oscillatory shafts adapted to move the toggle levers into and out of alinement, a pawl carried by the pivoted arm for intermittently operating the rotary shaft, and a roller on the latter for advancing the fibers.

13. In a machine for combing textile fibers, a rotatable drum, a driving shaft, a plurality of nippers, carried by the drum for seizing and releasing the fibers intermittently, a plurality of oscillatory shafts, blades carried by the latter for introducing the fibers into the nippers and removing them therefrom, crank arms fixed on the shafts, rods connecting the crank arms, a lever pivoted between its ends, a crank on the driving shaft in sliding connection with one arm of the lever, links connecting the free end of the lever with one of the oscillatory shafts, a rotary shaft, an arm pivoted on the latter, a comb mounted on the free end of the arm, toggle-levers mounted on a fixed pivot and connected to the pivoted arm, a link connection between the toggle lever and one of the oscillatory shafts adapted to move the toggle levers into and out of alinement, a ratchet wheel fixed on the rotary shaft, a pawl fixed on the pivoted arm engaging the ratchet wheel, and a roller on the rotary shaft for advancing the fibers.

14. In a machine for combing textile fibers, a rotatable drum, a driving shaft, a plurality of nippers carried by the drum for seizing and releasing the fibers intermittently, a plurality of oscillatory shafts, blades carried by the latter for introducing the fibers into the nippers and removing them therefrom, mechanism for combing the fibers operated by the blade operating mechanism, mechanism for discharging the combed fibers comprising a discharge roller, means for intermittently rotating the latter, a pressure roller, means for oscillating the latter forward around the axis of the discharge roller while the latter is stationary, and returning the pressure roller during the rotation of the discharge roller, and an endless carrier intermittently driven by the driving means of the discharge roller.

In testimony that I claim the foregoing as my invention, I have signed my name.

RICCARDO SCHLEIFER.